United States Patent [19]

Schubert

[11] 3,722,048
[45] Mar. 27, 1973

[54] SPINDLE CONTROL

[75] Inventor: Karl P. Schubert, Mayfield Heights, Ohio

[73] Assignee: Acme-Cleveland Corporation, Cleveland, Ohio

[22] Filed: Sept. 15, 1971

[21] Appl. No.: 180,699

[52] U.S. Cl. ..........................29/37 R, 82/3, 279/51, 29/64, 82/28 B
[51] Int. Cl. ..........................B23b 9/04, B23b 31/26
[58] Field of Search......82/2.7, 3; 29/37 R, 37 A, 64; 279/51

[56] References Cited

UNITED STATES PATENTS 2,577,442   12/1951   Adams et al. ..............................29/37

FOREIGN PATENTS OR APPLICATIONS 1,477,880   9/1969   Germany....................................82/3
984,824   3/1965   Great Britain.........................82/28 B

*Primary Examiner*—Francis S. Husar
*Attorney*—Woodling, Krost, Granger and Rust

[57] ABSTRACT

A spindle control for a multiple spindle automatic bar machine tool is disclosed with the machine tool being one having a spindle carrier journaled in a frame for indexable rotation about an axis. A plurality of bar receiving rotatable spindles are journaled in the spindle carrier and an electric clutch and brake unit is provided within the length of the spindle carrier for each spindle with the clutch and brake unit having a small enough outside diameter to pass through one of the end openings of the spindle carrier during manufacture and having a sufficiently large inside diameter to accept bar workpieces through the hollow spindle. Collets are provided in each spindle to grip the bar workpieces and are actuated by means which has no relative rotation between the collet actuator and the finger holder sleeve on each spindle, yet permits relative indexing movement between each sleeve and the collet actuator. The foregoing abstract is merely a resume of one general application, is not a complete discussion of all principles of operation or applications, and is not to be construed as a limitation on the scope of the claimed subject matter.

20 Claims, 4 Drawing Figures

INVENTOR.
KARL P. SCHUBERT
BY Woodling, Krost,
Granger and Rust
ATTORNEYS.

SPINDLE CONTROL

BACKGROUND OF THE INVENTION

Multiple spindle automatic machine tools are of two general types, chucking and bar types. The chucking type is one which has a lathe type chuck on the front of each spindle to chuck individual workpieces, often of irregular outline. Bar machines are those machining successive workpieces off the end of a long bar perhaps 10 to 15 feet in length with the bar protruding from the front end of a hollow, rotatable bar receiving spindle. In such case a stock reel is provided carrying workpiece bars and this entire stock reel indexes with the spindle carrier. Such bar machines have collets in the nose of each spindle to grip the bar workpieces.

In many cases it is necessary to stop an individual spindle while the others remain rotating. This may be necessary for a cross milling or drilling function at a particular spindle position of the spindle carrier. In such case, the drive to the spindles cannot be a continuous drive of gearing, for example, instead there must be a clutch for each spindle so that it may be de-clutched from the drive means. Also, it is customary in such case to have a brake for the spindle so that the spindle need not coast to a stop and thus waste time. The prior art has used many forms of mechanically actuated clutches and brakes for each spindle of a multiple spindle machine. Such mechanically actuated units are subject to considerable wear requiring frequent adjustment and consequent downtime of the machine in order to operate properly. In the chucking type machines as distinguished from the bar machines, the prior art has also known the use of electric clutch and brake units for each spindle. Such construction is permissible in chucking machines because the electric clutch and brake unit need not have a large inside diameter, especially when mounted on the spindle end, but with such clutch and brake units positioned outboard at the rear of the spindle carrier, thus they were cantilevered beyond the rear-most bearing of the spindle within the spindle carrier, and made an extra long machine with unsatisfactory support.

In the multiple spindle automatic bar machine, this type of clutch brake unit was not known because bar machines must necessarily have a large inside diameter of each spindle in order to accept the bar workpiece therethrough, these units would have had a too large outside diameter to fit into the available carrier spacing, inside or outside of the carrier.

The described electric clutch and brake unit, despite a relatively large inside diameter, has a small enough outside diameter to fit into this spacing, making the use of these clutch and brake units inside the carrier possible even on a bar machine.

The spindle carrier cannot be made inordinately large in relation to the size of the bar workpieces, otherwise the entire machine tool becomes too large, unwieldy and too slow in its cycle of operation.

Accordingly, an object of the invention is to provide a multiple spindle automatic bar machine which overcomes the above-mentioned disadvantages.

Another object of the invention is to provide a multiple spindle automatic bar machine having a clutch and brake unit inside the spindle carrier on each spindle.

Another object of the invention is to provide a multiple spindle automatic bar machine with a clutch and brake unit for each spindle with a large inside diameter to accept bar workpieces and a small outside diameter to be passed through the hole in the spindle carrier journaling the spindle.

Another object of the invention is to provide a multiple spindle automatic bar machine with a central drive gear inside the spindle carrier to drive each of the plural spindles and with the spindles having clutch and brake units thereon inside the spindle carrier.

Another object of the invention is to provide a multiple spindle automatic bar machine with a non-rotative sleeve on each spindle having a shoulder coacting with a longitudinally movable collet actuator and as the spindle carrier indexes these shoulders successively come into position for longitudinal actuation by the actuator, yet with no relative rotation between the actuator and the sleeve shoulder.

SUMMARY OF THE INVENTION

The invention may be incorporated in a spindle control in a multiple spindle bar machine tool having a spindle carrier journaled in a frame for indexable rotation about an axis, said spindle control comprising, in combination, a plurality of hollow rotatable bar receiving spindles journaled in said spindle carrier about axes parallel to said spindle carrier axis, said spindle carrier having a finite length, an electric clutch and brake unit on each of said spindles intermediate the length of said spindle carrier, drive means, means connecting each of said spindles selectively through said clutch unit to said drive means to drive the spindle and alternatively through said brake unit to said spindle carrier to brake the respective spindle relative to said spindle carrier, and coil means having first and second electrical conditions to actuate said clutch and said brake, respectively, for each spindle.

Other objects and a fuller understanding of the invention may be had by referring to the following description and claims, taken in conjunction with the accompanying drawing.

DESCRIPTION OF THE PREFERRED EMBODIMENT

Figure 1:
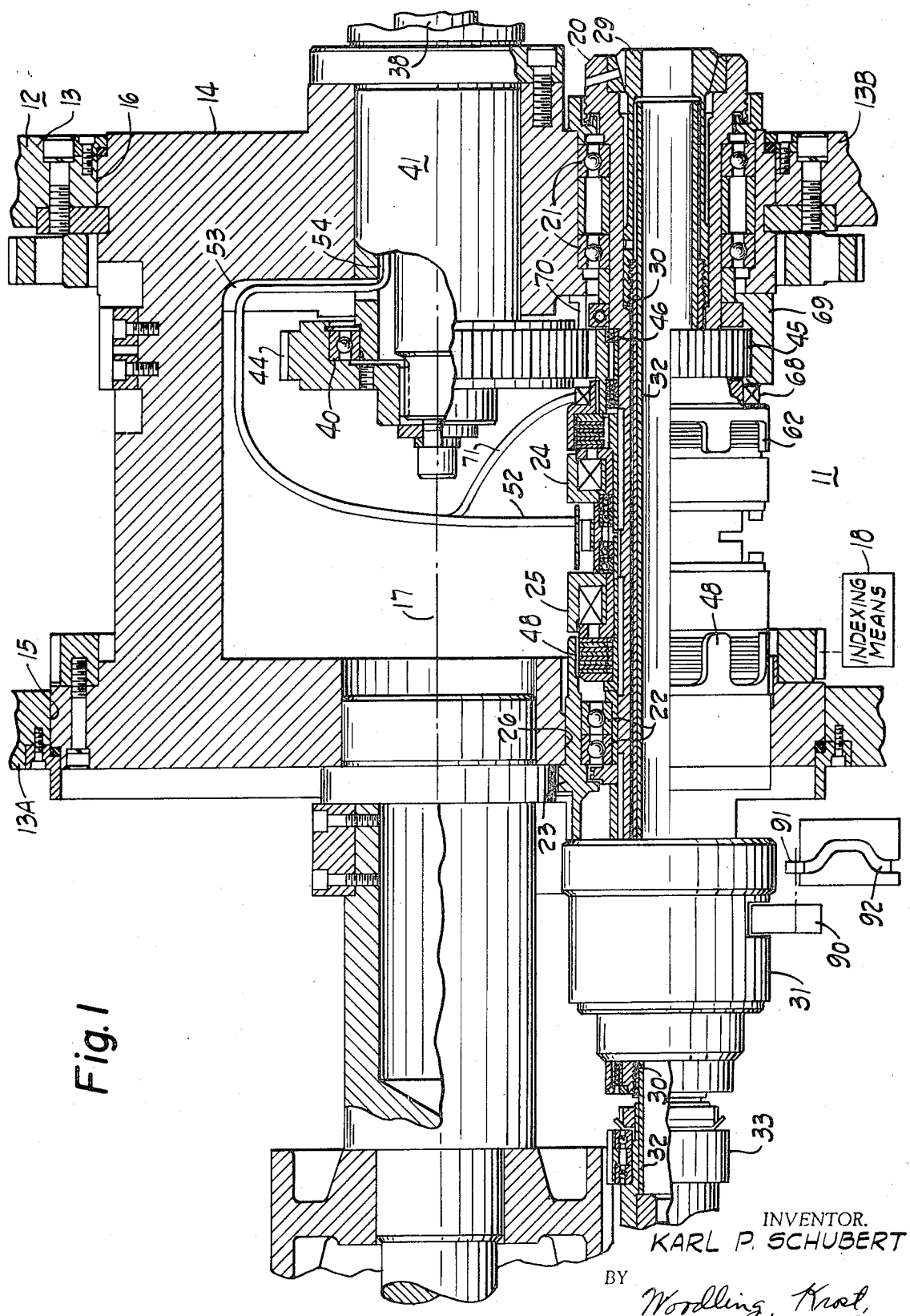
FIG. 1 is a longitudinal sectional view through the spindle carrier and headstock end of a multiple spindle automatic bar machine incorporating the invention.

A spindle control 11 is provided for a multiple spindle automatic bar machine 12 having a frame including a headstock frame 13. This headstock frame has a rear wall 13A and a front wall 13B with the front wall 13B adjacent a tooling or working area to the right of FIG. 1. The headstock frame 13 journals a spindle carrier 14 at journals 15 and 16 in the rear and front walls 13A and 13B, respectively. The spindle carrier 14 is accordingly journaled for indexable rotation about a spindle carrier axis 17. An indexing means 18 may be provided to establish such intermittent indexing movement of the spindle carrier. Such indexing means 18 may be any of the usual forms, indexing the spindle carrier into a plurality of positions equal in number to the number of spindles 20 journaled for rotation in the spindle carrier 14. There may be four, six or eight of such spindles, for example. Each of the spindles 20 is a hollow bar receiving spindle. Bearings 21 journal each spindle in the front of the spindle carrier 14 and bearings 22 journal the rear of each spindle inside a hub 23 fixed in the rear wall of this spindle carrier 14. The spindle carrier 14 may be a large integral machine casting having a finite length between and journaled in the rear and front walls 13A and 13B of the headstock frame.

An electric clutch 24 and brake 25 unit is provided on each spindle 20. It is provided within the finite length of the spindle carrier 14, and in this particular design the clutch and brake unit has been made with a sufficiently small outside diameter to pass through, during manufacture of the machine tool, the cylindrical aperture 26 in the rear wall of the spindle carrier 14. Also, this clutch and brake unit 24, 25 has a sufficiently large inside diameter 28, see FIG. 3, to permit acceptance of long bar workpieces within the spindle 20. It will be appreciated that current multiple spindle automatic bar machine tool practice requires a number of separate parts within each spindle 20. The spindle 20 carries within it a collet 29 at the spindle nose or front end of the spindle. To actuate this collet 29 between open and closed positions, it is pushed and pulled by a collet tube 30 coaxially inside the spindle 20. A fingerholder assembly 31, described below, actuates this collet tube 30. Also coaxially inside the collet tube 30 is a stock pusher tube 32 actuated by a bar stock feeder 33 at appropriate times in the cycle in order to feed out an appropriate length of the bar stock to form the next successive workpiece. Accordingly, it will be seen that there are a number of tubes inside the clutch-brake unit 24, 25. The smallest is the stock pusher tube 32, next is the collet tube 30, next is the spindle 20 and finally, there are the sleeves 34 and 35, see FIG. 3, non-rotatively keyed to the outside of the spindle 20. This illustrates why the inside diameter 28 of the clutch-brake unit 24, 25 must be large in diameter relative to the outside diameter of this clutch brake unit in order to have room for a bar workpiece within the spindle 20. The present invention frame 37 and journaled by such a clutch-brake unit which is compact in a radial dimension.

Figure 4:
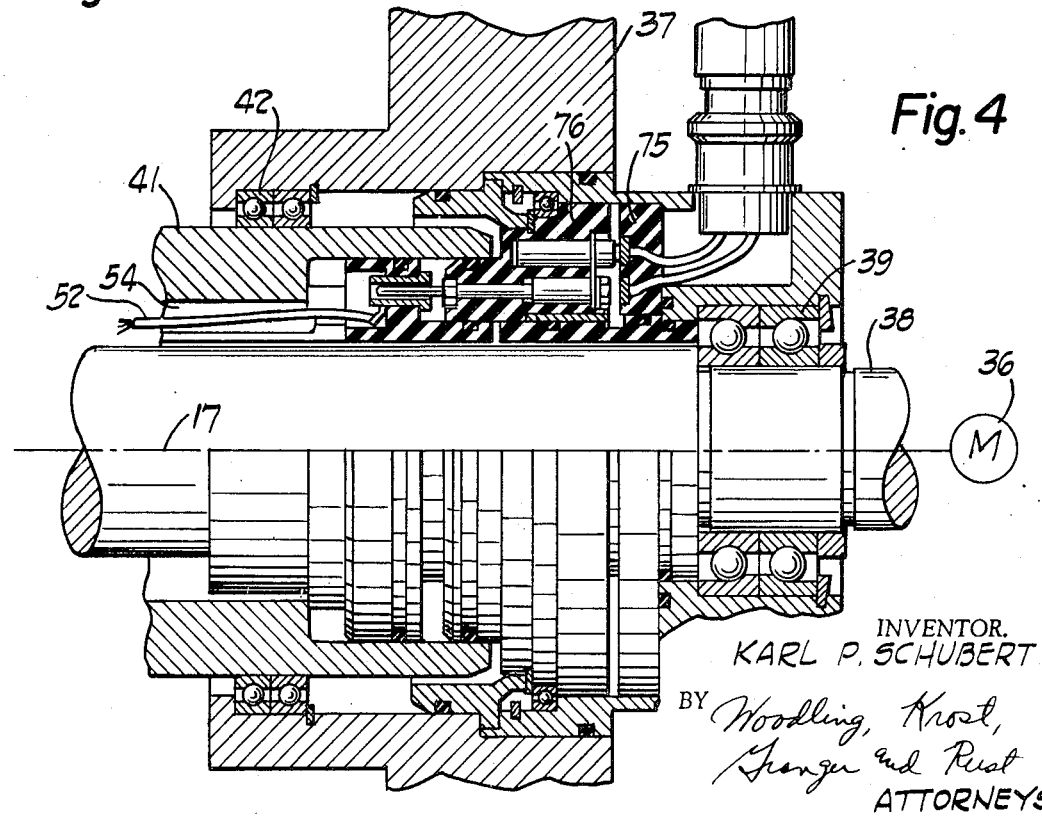

Drive means is provided for each of the spindles 20 and starts with a motor 36, see FIG. 4. This motor is fixed relative to the frame of the machine and especially the frame of the gearbox 37. The motor is connected to drive a spindle drive shaft 38 which is coaxial with the axis 17. This spindle drive shaft passes through the tooling area between the headstock and the gearbox. It is journaled by the bearings 39 in the gearbox frame 37 and journaled by a bearing 40 on a spindle carrier stem 41 fixed in the front of the spindle carrier 14. This spindle carrier stem is a hollow shaft surrounding the spindle drive shaft 38 and also extends through the tooling area to be journaled by bearings 42 in the gear box frame 37. This spindle drive shaft 38 has fixed thereto a central drive gear 44 which meshes with a spindle gear 45 on each of the spindles 20. Each such spindle gear 45 is journaled by bearing 46 on the respective spindle. Each spindle is thus able to be selectively and alternatively clutched and braked. If the clutch 24 is engaged, the spindle 20 is engaged with the spindle gear 45 to be driven from the motor 36. If, alternatively, the brake 25 is engaged, then the spindle 20 is connected by means of fingers 48 on the hub 23 to the spindle carrier 14 to be braked.

Figure 3:
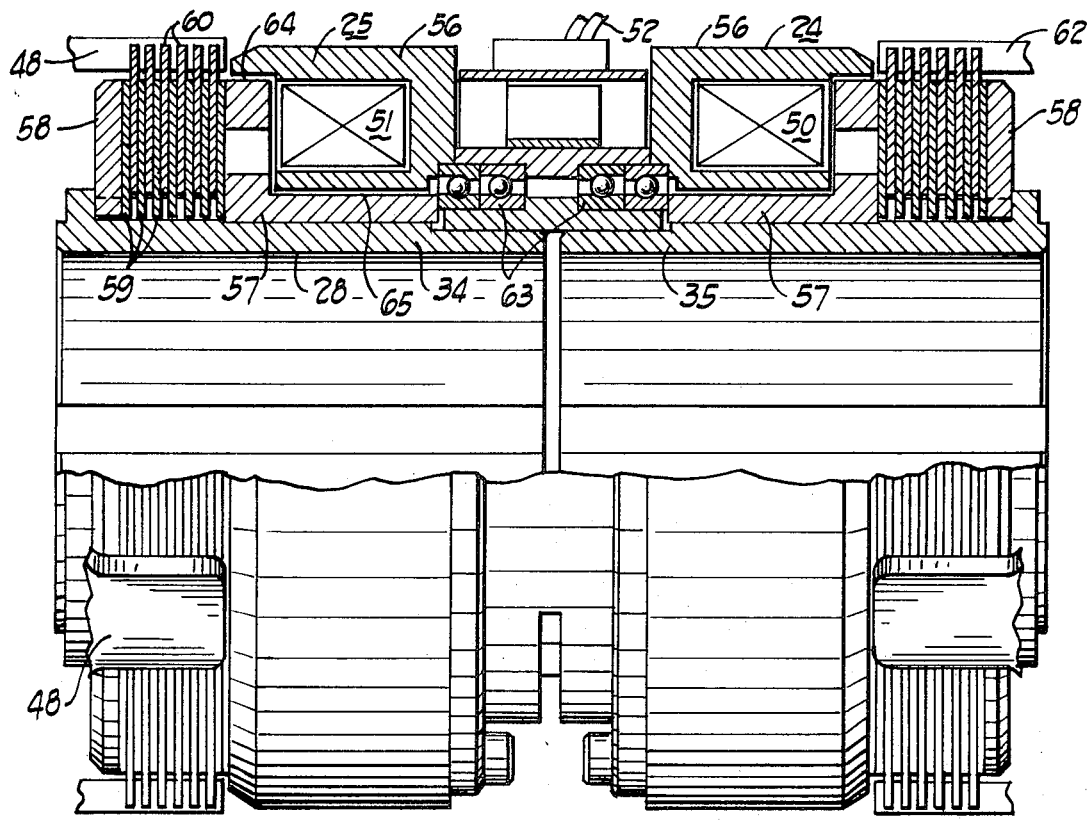
FIG. 3 is an enlarged view partly in section of an electric clutch and brake unit used on each spindle; and, FIG. 4 is an enlarged view partly in section of a commutator and brush assembly supplying electrical energization to the clutch and brake units.

FIG. 3 better shows the internal construction of the clutch 24 and brake 25. Coil means including an electric clutch coil 50 and a brake coil 51 are provided in the clutch and brake, respectively. These coils are stationary relative to the spindle carrier 14 and are energized through a connecting cable 52 which bypasses the central drive gear 44 and passes through a channel 53 in the spindle carrier 14 and through a longitudinal channel 54 inside the spindle carrier stem 41 and between this stem 41 and the spindle drive shaft 38. FIGS. 1 and 4 show these channels. The clutch-brake unit 24, 25 is shown in FIG. 3 as a magnetically permeable core 56 surrounding each of the coils 50 and 51 with the flux acting through a permeable hub 57 and the sleeve 34 or 35 to a movable armature 58. Between the armature 58 and hub 57 there are a plurality of first discs 59 and second discs 60. The first discs 59 or odd number discs are keyed for non-rotation relative to the sleeve 34 and the second discs or even numbered discs 60 are keyed for non-rotation relative to the fingers 48 of the hub 23, which is fixed to the spindle carrier 14. this is the construction for the brake 25 and the clutch 24 has a similar construction except that the second discs 60 are keyed to fingers 62 which are fixed to the spindle gear 45 and rotate therewith. The cores 56 are non-rotative relative to the spindle carrier 14 and have bearings 63 journaling the hubs 57 for rotation. The armatures 58 also rotate as do the first set of discs 59. When the coil 51 is energized, for example, through the conductor cable 52, then flux threads through the core 56 passing across an air gap 64 through the clutch discs 59 and 60 to the armature 58 and returning through the sleeve 34 and hub 57 crossing an air gap 65 to return to the core 56. This action pulls the armature 58 toward the coil 51 and engages the multiple discs, to engage the clutch or brake as the case may be. This is a construction which is exceptionally compact in radial dimension for a small outside diameter and a large inside diameter.

A degausing coil 68, see FIG. 1 is provided on each spindle toward the front of the clutch/brake unit. This degausing coil encircles each spindle and cooperates with a hub 69 which together with the spindle gear 45 carries the flux established by this coil. Each coil is stationary relative to the spindle carrier 14 by being supported on arms 70 extending from the spindle carrier 14 in non-interfering positions with the gears 44 and 45. A branch conductor 71 joins the conductor cable 52 to provide energization to this degausing coil 68. The degausing coil 68 is supplied with direct current energy sufficient to overcome any stray flux in the spindle 20 generated by the clutch or brake coils 50 or 51. By this means the spindle nose and collet 29 do not become magnetic and hence do not attract metal chips from the cutting of the workpieces.

FIG. 4 illustrates a commutator assembly 75 fixed relative to the gear box frame 37 and a brush carrier assembly 76 which is fixed to and indexably rotates with the spindle carrier stem 41. This commutator and brush assembly 75, 76 supplies electrical energy from a stationary part of the machine tool 12 to the conductor cable 52. By this means the clutches and brakes 24 and 25 are selectively actuated for each of the plurality of spindles.

Figure 2:
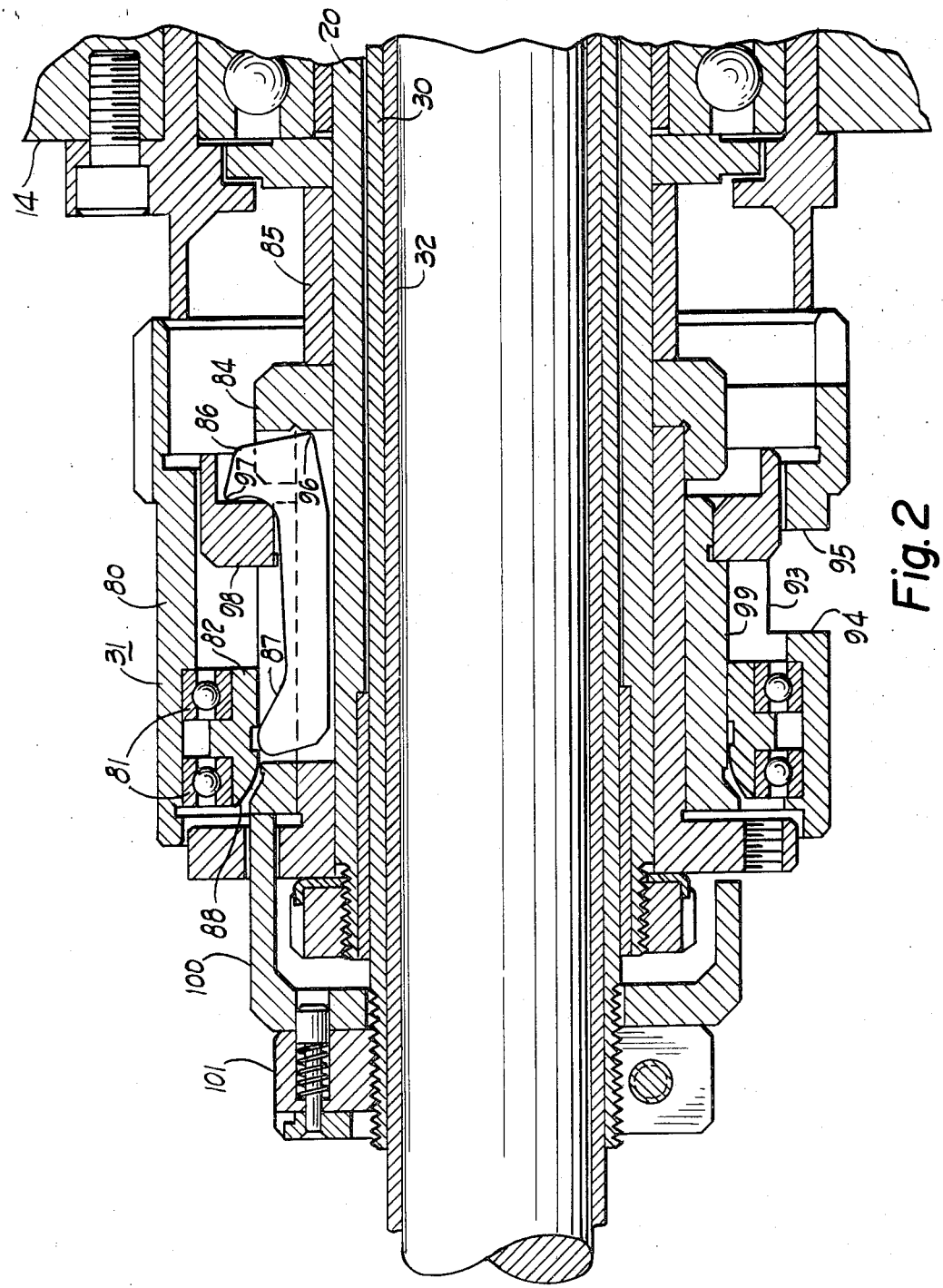
FIG. 2 is an enlarged longitudinal sectional view through the finger holder assembly of a spindle.

FIG. 2 illustrates the collet actuating means which includes a sleeve 80 non-rotatively keyed to the spindle carrier 14 for longitudinal movements. Bearings 81 are combined thrust and radial bearings and journal a collar 82 therewithin for rotation with the spindle 20. A finger holder hub 84 is longitudinally fixed by a spacer 85 relative to the spindle carrier 14. This hub 84 carries a plurality of fingers, for example, three such fingers 86. The rear end of the fingers are tapered at 87 to cooperate with a conically tapered end 88 on the collar 82. A shoe 90, see FIG. 1, is non-rotatively mounted on the frame 13 of the headstock by means not shown but may move longitudinally. It is moved by a cam follower 91 coacting with a cam 92 driven by any suitable means such as from the motor 36. By this means the shoe 90 is moved longitudinally relative to the frame 13. The shoe 90 fits within an arcuate groove 93 on each of the sleeves 80. This groove 93 is not an annular groove around the sleeve 80 but is only part of an arc around such sleeve. The groove 93 has shoulders 94 and 95 which are longitudinal and which may coact with the shoe 90. As the spindle carrier 14 has its indexing movement, each sleeve 80 will be indexed rotatively into position with the shoulders 94 and 95 straddling the shoe 90. It will be noted that this groove 93 is at one of the outermost or innermost radius portions of each spindle relative to the spindle carrier axis 17 and in this preferred embodiment is at the outermost radius portion.

When the shoe is moved longitudinally to the left to the position shown in FIG. 2, then the collet 29 is closed. It does this by acting through the bearings 81 to move the collar 82 to the left. The conically tapered surface 88 then coacts with the finger tapered ends 87 to move the finger ends radially inwardly. Each finger then pivots at a corner 96 against the hub 84 and the finger lever extension 97 acts against a bushing 98 moving it to the left to the position shown in FIG. 2. Bushing 98 acts through a spacer 99, pushing a spacer 100 and nut 101 to the left to the position shown in FIG. 2. This pulls the collet tube 30 to the left to close the collet 29.

By this construction, it will be seen that there is no relative rotation between the sleeve 80 and the shoe 90 during the collet actuation. There is a relative indexing rotation caused by indexing movement of the spindle carrier 14 but this merely establishes each successive sleeve 80 in position to be acted on by the longitudinally moving shoe 90. It will be noted that the above-described construction provides a spindle carrier with a minimum rear overhang of only the fingerholder assembly 31 and the barstock feeder 33. This is distinguished from the prior art construction which usually had the clutches and brakes positioned between the fingerholder assembly and the rearwall of the spindle carrier 14. With the clutch and brake in such rearward location the prior art usually had a construction wherein the sleeve of the fingerholder necessarily had to rotate and this caused considerable wear between the sleeve shoulder and the non-rotating collet actuation shoe. This was especially true if the machine was stopped with the collet in the half open or half closed position. The present construction eliminates this rotation and hence eliminates the wear at this point.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A spindle control in a multiple spindle bar machine tool having a spindle carrier journaled in a frame for indexable rotation about an axis,
   said spindle control comprising, in combination,
   a plurality of hollow rotatable bar receiving spindles journaled in said spindle carrier about axes parallel to said spindle carrier axis,
   said spindle carrier having a finite length,
   an electric clutch and brake unit on each of said spindles intermediate the length of said spindle carrier,
   drive means,
   means connecting each of said spindles selectively through said clutch unit to said drive means to drive the spindle and alternatively through said brake unit to said spindle carrier to brake the respective spindle relative to said spindle carrier,
   and coil means having first and second electrical conditions to actuate said clutch and said brake, respectively, for each spindle.

2. A spindle control as set forth in claim 1, wherein said coil means includes an electric coil for said clutch and another electric coil for said brake.

3. A spindle control as set forth in claim 1, wherein said coil means are stationary relative to said spindle carrier.

4. A spindle control as set forth in claim 1, wherein said drive means includes a central drive gear coaxial relative to said spindle carrier axis,
   and a spindle gear on each said spindle meshing with said central drive gear.

5. A spindle control as set forth in claim 1, including a degaussing coil surrounding each said spindle.

6. A spindle control as set forth in claim 1, including a collet at the forward end of each said spindle,
   and a degaussing coil surrounding each said spindle between said clutch and brake coil means and said collet to prevent magnetization of said collet by said clutch and brake coil means.

7. A spindle control as set forth in claim 1, including a cylindrical aperture in the spindle carrier for the journaling of each said spindle,
   said clutch and brake for each spindle having an outside diameter smaller than said cylindrical aperture to pass therethrough during assembly of the machine tool.

8. A spindle control as set forth in claim 7, including a hub fixed in each of said cylindrical apertures,
 and means journaling each said spindle in the respective hub.

9. A spindle control as set forth in claim 1, including a collet within and at the forward end of each of said spindles to accept and grip long bar workpieces extending completely through each spindle in said spindle carrier,
 and means to actuate said collet including an actuator non-rotative and longitudinally movable relative to the frame and a shoulder non-rotative and longitudinally movable on each said spindle.

10. A spindle control as set forth in claim 1, including a collet at the forward end of each said spindle,
 means to actuate said collet including an actuating shoe longitudinally movable and non-rotative relative to the frame,
 and a longitudinally movable shoulder non-rotative relative to each said spindle connected to said collet and movable into actuable engageable with said shoe by the indexing movement of the spindle carrier.

11. A spindle control as set forth in claim 10, including a fingerholder assembly in said collet actuating means,
 and a sleeve on said fingerholder assembly mounting said shoulder.

12. A spindle control in a multiple spindle bar machine tool having a spindle carrier journaled in a frame for indexable rotation about an axis,
 said spindle control, comprising, in combination,
 a plurality of hollow rotatable bar receiving spindles journaled in said spindle carrier about axes parallel to said spindle carrier axis,
 a collet at the forward end of each of said spindles to accept and grip long bar workpieces extending completely through each spindle in the spindle carrier,
 means to actuate said collet including a finger holder assembly on each spindle mounted to the rear of the spindle carrier,
 said finger holder assembly including a sleeve keyed for longitudinal and non-rotative movement relative to the carrier,
 a rotatable collar inside said sleeve fastened for rotation with the respective spindle,
 bearing means between said sleeve and said collar to permit said collar rotation and to transmit longitudinal movement to said collar,
 a longitudinal shoulder on each of said sleeves at one of the outermost and innermost radius portions of said sleeves relative to the spindle carrier axis,
 and a longitudinally movable collet actuating shoe non-rotatively mounted on said frame to engage said sleeve shoulders in sequence upon indexing motion of the spindle carrier without rotation between said shoulder and said shoe during each indexed position of the spindle carrier.

13. A spindle control as set forth in claim 12, wherein said bearing is a combined thrust and radial bearing.

14. A spindle control as set forth in claim 12, wherein said collet actuating means includes a tapered surface on said collar,
 and a plurality of fingers acting on said tapered surface to be moved radially inwardly upon longitudinal movement in a first direction of said collar.

15. A spindle control as set forth in claim 12, wherein said shoulders are on the outermost radius portion of each sleeve relative to the spindle carrier axis.

16. A spindle control as set forth in claim 12, wherein said sleeve shoulders are a part of an arcuate non-annular groove in each sleeve.

17. A spindle control as set forth in claim 12, including a clutch on each of said spindles within the spindle carrier,
 drive means,
 and means connecting each of said spindles through said clutch to said drive means to rotate the respective spindle.

18. A spindle control as set forth in claim 17, wherein said drive means includes a central drive gear coaxial with said carrier axis and within the spindle carrier,
 and a gear journaled on each spindle meshing with said central drive gear.

19. A spindle control as set forth in claim 18, including a brake on each of said spindles within the spindle carrier,
 and means selectively connecting each of said spindles through the associated clutch or through said respective brake to said spindle carrier.

20. A spindle control as set forth in claim 19, including electrical coil means associated with each said clutch and brake on a respective spindle,
 and means connecting said coil means for first and second electrical energization conditions for actuation of said clutch and brake, respectively, on each spindle.

* * * * *